(12) United States Patent
Song (10) Patent No.: US 9,331,856 B1
(45) Date of Patent: May 3, 2016

(54) SYSTEMS AND METHODS FOR VALIDATING DIGITAL SIGNATURES

(71) Applicant: Symantec Corporation, Mountain View, CA (US)

(72) Inventor: Qu Bo Song, Chengdu (CN)

(73) Assignee: Symantec Corporation, Mountain View, CA (US)

( * ) Notice: Subject to any disclaimer, the term of this patent is extended or adjusted under 35 U.S.C. 154(b) by 42 days.

(21) Appl. No.: 14/177,211

(22) Filed: Feb. 10, 2014

(51) Int. Cl.
*G06F 21/64* (2013.01)
*H04L 9/32* (2006.01)

(52) U.S. Cl.
CPC .............. *H04L 9/3247* (2013.01); *G06F 21/64* (2013.01)

(58) Field of Classification Search
None
See application file for complete search history.

(56) References Cited

U.S. PATENT DOCUMENTS

| | | | | |
|---|---|---|---|---|
| 8,534,543 B1* | 9/2013 | Eker et al. | | 235/375 |
| 2003/0200505 A1* | 10/2003 | Evans | | 715/507 |
| 2008/0177799 A1* | 7/2008 | Wilson | | 707/200 |
| 2012/0308003 A1* | 12/2012 | Mukherjee | | 380/243 |
| 2013/0272523 A1* | 10/2013 | McCorkindale et al. | | 380/243 |
| 2014/0111542 A1* | 4/2014 | Wan | G06F 17/30253 | 345/633 |
| 2014/0139422 A1* | 5/2014 | Mistry | G06F 3/014 | 345/156 |
| 2014/0267011 A1* | 9/2014 | Devries | | 345/156 |

OTHER PUBLICATIONS

Lee, Jae-Il et al., "A Model for Embedding and Authorizing Digital Signatures in Printed Documents", ICISC'02 Proceedings of the 5th international conference on Information Security and Cryptology, Springer Berlin Heidelberg, Seoul, Korea, (Nov. 28-29, 2002), 465-477.
Warasart, Maykin et al., "Paper-based Document Authentication using Digital Signature and QR Code", 2012 4th International Conference on Computer Engineering and Technology (ICCET 2012), Bangkok, Thailand, (May 12-13, 2012).
"Digital signature", http://en.wikipedia.org/wiki/Digital_signature, as accessed Dec. 11, 2013, Wikipedia, (Dec. 9, 2003).
"Barcode", http://en.wikipedia.org/wiki/Barcode, as accessed Dec. 11, 2013, Wikipedia, (Jun. 14, 2004).
"QR code", http://en.wikipedia.org/wiki/Qr_code, as accessed Dec. 11, 2013, Wikipedia, (Oct. 19, 2004).

* cited by examiner

*Primary Examiner* — David Pearson
(74) *Attorney, Agent, or Firm* — ALG Intellectual Property, LLC (57) ABSTRACT

A computer-implemented method for validating digital signatures may include (1) receiving, through a camera of smart glasses, an image of an object, (2) decrypting, using a processor of the smart glasses, a digital signature on the object to obtain a decrypted digital signature, (3) attempting, using the processor of the smart glasses, to validate the object by comparing content of the object with the decrypted digital signature, and (4) outputting a result of the attempt to validate the object from an output component of the smart glasses. Various other methods, systems, and computer-readable media are also disclosed.

20 Claims, 7 Drawing Sheets

SYSTEMS AND METHODS FOR VALIDATING DIGITAL SIGNATURES

BACKGROUND

Individuals and organizations often seek to authenticate messages, whether they are sent by hand carry, mail, email, or other methods. Historically, individuals have signed their messages in ink, or sealed them with a particular or unique wax seal. Unfortunately, these historical methods may be vulnerable to attacks by others who impersonate or forge the signature or seal.

In other arts, individuals and organizations often seek to encrypt their communications. For examples, an author of a message may encode the message using a cipher, and the recipient may decode the message using the same cypher. Unfortunately, in these systems, both the author and the recipient may need to share the same cypher or symmetric key. That requirement raises the question of how to safely keep secret, transmit, and/or encrypt the cypher itself. In view of the above, some individuals have developed and used digital signatures, which may not suffer from some of these disadvantages, as further discussed below.

In all of the above cases, however, there is no quick and efficient manner for a user to look at a document and authenticate the document without substantial manual intervention. For example, the user may need to stop reading the document, feed it into a manual scanner, and then work on a desktop computer to process the scan results in authentication software. What is needed, therefore, are improved systems and methods for validating digital signatures.

SUMMARY

As will be described in greater detail below, the instant disclosure generally relates to systems and methods for validating digital signatures by conveniently using smart glasses to detect and/or validate digital signatures on various objects, such as paper documents. The smart glasses may validate the digital signatures manually in response to a user command, semi-automatically, or automatically (e.g., autonomously).

In one example, a computer-implemented method for validating digital signatures may include (1) receiving, through a camera of smart glasses, an image of an object, (2) decrypting, using a processor of the smart glasses, a digital signature on the object to obtain a decrypted digital signature, (3) attempting, using the processor of the smart glasses, to validate the object by comparing content of the object with the decrypted digital signature, and (4) outputting a result of the attempt to validate the object from an output component of the smart glasses.

In some embodiments, attempting to validate the object by comparing the content of the object with the decrypted digital signature may be performed in response to a user command. In some examples, attempting to validate the object by comparing the content of the object with the decrypted digital signature may also be performed autonomously by the smart glasses in response to detecting the digital signature on the object. The object may include a paper document.

In some embodiments, attempting to validate the object by comparing the content of the object with the decrypted digital signature may include computing, using a processor of the smart glasses, a hash based on the content of the object. Moreover, computing the hash based on the content of the object may include (1) performing optical character recognition on human-readable characters on the object and (2) computing the hash based on a result of the optical character recognition. Computing the hash based on the content of the object may include computing a hash for each of multiple different variations of the result of the optical character recognition. In some examples, computing the hash based on the content of the object may also include (1) decoding a two-dimensional bar code on the object, (2) decompressing a result of decoding the two-dimensional bar code, and (3) computing the hash based on a message contained within the decompressed result of decoding the two-dimensional bar code.

In some embodiments, attempting to validate the object may further include comparing a hash based on a result of optical character recognition of human-readable characters on the object with a hash based on a message extracted from a two-dimensional bar code on the object. In some examples, attempting to validate the object may include displaying a result, through the output component of the smart glasses, of the message extracted from the two-dimensional bar code while the smart glasses are oriented for viewing at least part of the human-readable characters, thereby enabling the user to identify errors in optical character recognition.

In some embodiments, decrypting the digital signature on the object to obtain the decrypted digital signature may include decrypting the digital signature using a public key. In some examples, attempting to validate the object by comparing the content of the object with the decrypted digital signature may include computing a hash based on a predefined subset of human-readable characters on the object.

In one embodiment, a system for implementing the above-described method may include (1) a reception module, stored in memory, that receives, through a camera of smart glasses, an image of an object, (2) a decryption module, stored in memory, that decrypts, using a processor of the smart glasses, a digital signature on the object to obtain a decrypted digital signature, (3) a validation module, stored in memory, that attempts, using the processor of the smart glasses, to validate the object by comparing the content of the object with the decrypted digital signature, and (4) an output module, stored in memory, that outputs a result of the attempt to validate the object from an output component of the smart glasses.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, through a camera of smart glasses, an image of an object, (2) decrypt, using a processor of the smart glasses, a digital signature on the object to obtain a decrypted digital signature, (3) attempt, using the processor of the smart glasses, to validate the object by comparing the content of the object with the decrypted digital signature, and (4) output a result of the attempt to validate the object from an output component of the smart glasses.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for validating digital signatures. As will be explained in greater detail below, the disclosed systems and methods may enable users to conveniently, and more efficiently, identify candidate documents for validation, validate them, and overcome errors or setbacks in a validation process, while minimizing interruptions in reading the document. For example, smart glasses may autonomously detect candidate documents for validation, validate them, and/or output results of attempts to validate the documents, without interrupting a user's reading or requiring the user to manually scan and process the documents.

Figure 1:
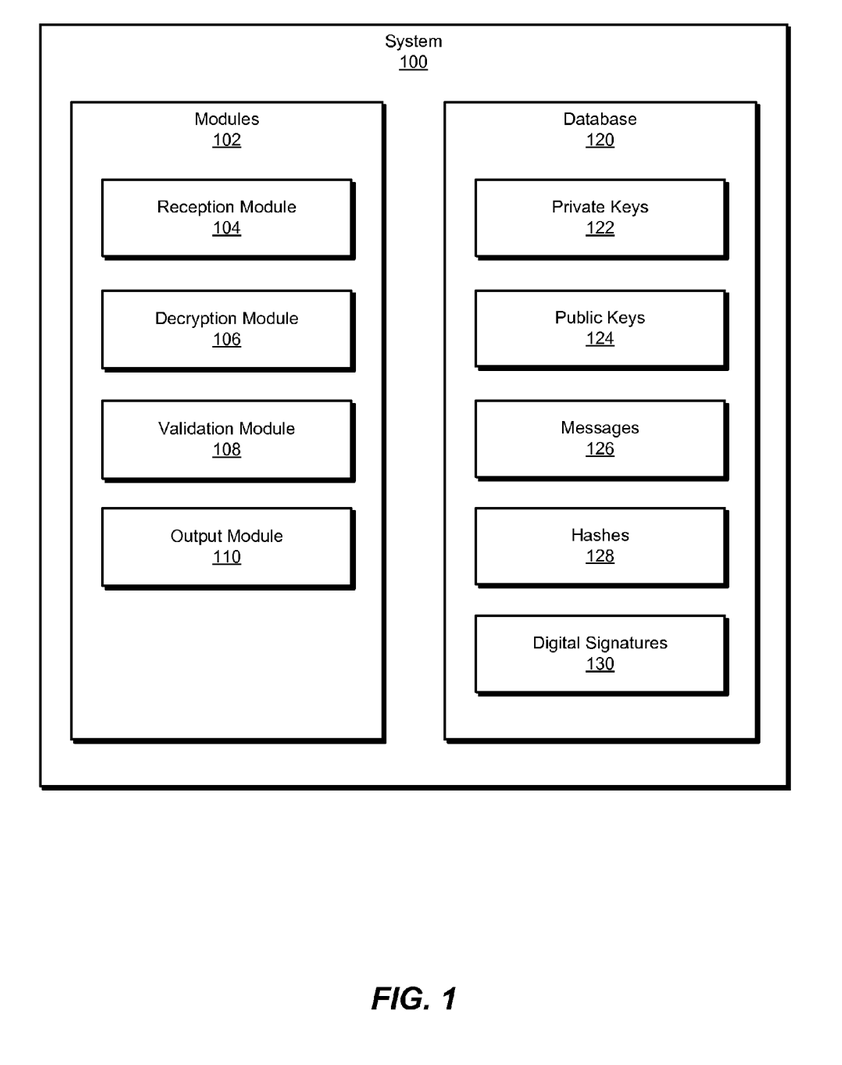
FIG. 1 is a block diagram of an exemplary system for validating digital signatures.
Figure 2:
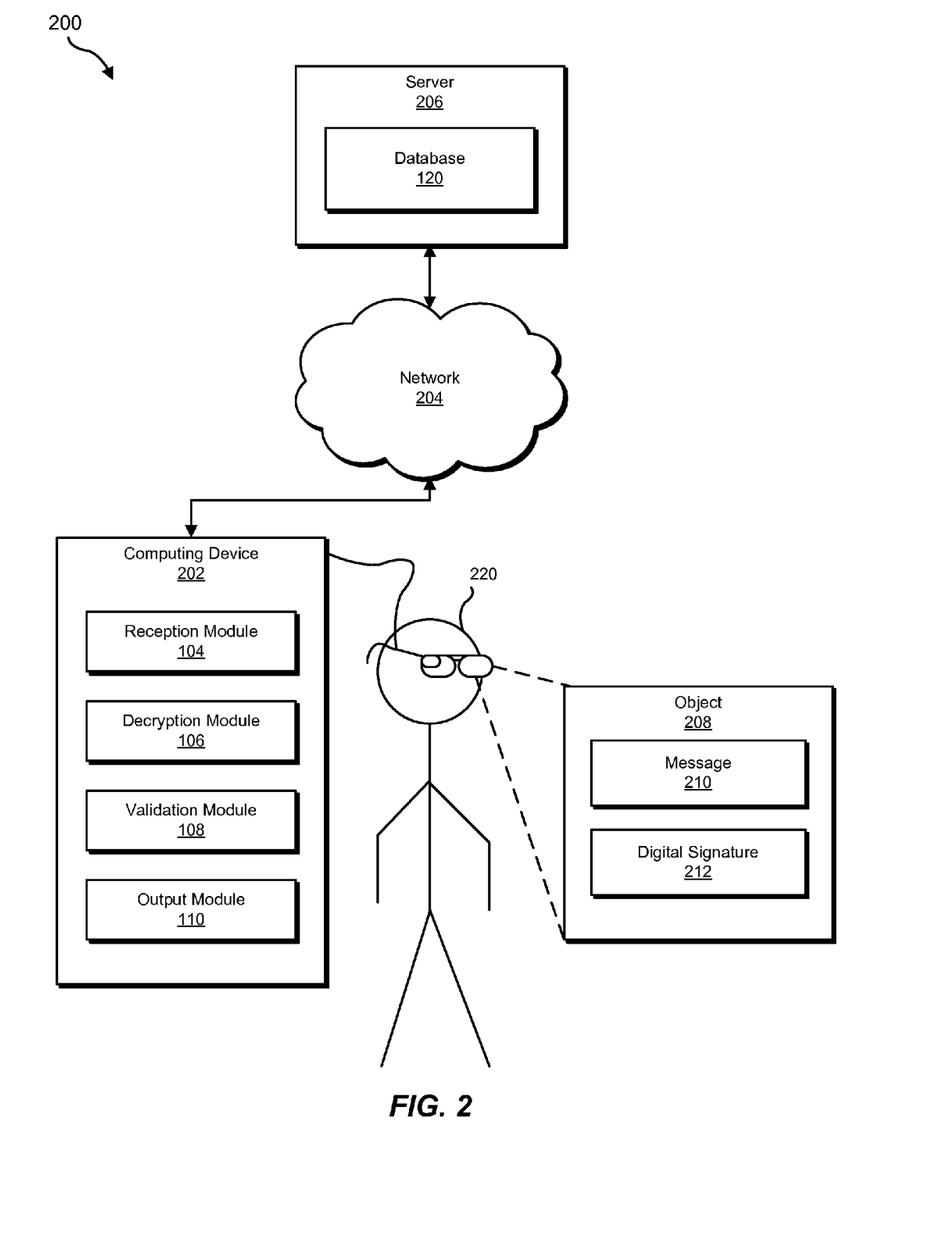
FIG. 2 is a block diagram of an additional exemplary system for validating digital signatures.

The following will provide, with reference to FIGS. 1-2, detailed descriptions of exemplary systems for validating digital signatures. Detailed descriptions of corresponding computer-implemented methods will also be provided in connection with FIG. 3. Moreover, detailed descriptions of exemplary digital signatures and corresponding objects, such as paper documents, will be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for validating digital signatures. As illustrated in this figure, exemplary system 100 may include one or more modules 102 for performing one or more tasks. For example, and as will be explained in greater detail below, exemplary system 100 may include a reception module 104 that receives, through a camera of smart glasses, an image of an object. In addition, and as will be described in greater detail below, exemplary system 100 may include a decryption module 106 that decrypts, using a processor of the smart glasses, a digital signature on the object to obtain a decrypted digital signature.

Moreover, exemplary system 100 may also include a validation module 108 that attempts, using the processor of the smart glasses, to validate the object by comparing content of the object with the decrypted digital signature. Exemplary system 100 may also include an output module 110 that outputs a result of the attempt to validate the object from an output component of the smart glasses. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store private keys 122 and public keys 124, which may correspond to public keys and private keys in a public key or asymmetric cryptography system. As used herein, the phrase "public key" or "asymmetric cryptography" system generally refers to systems that use separate public (which may held publicly without secrecy) and private keys (which may be kept secret by an individual) to encrypt and decrypt messages. Database 120 may also be configured to store messages 126, which may correspond to messages encrypted and/or transmitted through an encrypted communication system, including paper documents, as further discussed below. Moreover, database 120 may also include hashes 128, which may correspond to a result of a mathematical hash function used within a cryptography system. As a last example, database 120 may also be configured to store digital signatures 130. As used herein, the phrase "digital signature" generally refers to digital-based signatures on objects, such as paper documents, that verify the authenticity of the document and/or the document's author. In some embodiments, digital signatures may correspond to content and/or hashes of a message encrypted using a signer's private key.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to validate digital signatures. For example, and as will be described in greater detail below, one or more of modules 102 may cause computing device 202 and/or server 206 to receive, through a camera of smart glasses (such as those worn by person 220 in FIG. 2), an image of an object 208. As shown in FIG. 2, person 220 may view object 208 through the smart glasses, which may correspond to computing device 202. One or more modules 102 may further cause computing device 202 and/or server 206 to decrypt, using a processor of the smart glasses, a digital signature 212 on object 208 to obtain a decrypted digital signature. Moreover, one or more modules 102 may also cause computing device 202 and/or server 206 to attempt, using the processor of the smart glasses, to validate object 208 by comparing content of the object with the decrypted digital signature from digital signature 212. Lastly, one or more modules 102 may also cause computing device 202 and/or server 206 to output a result of the attempt to validate object 208 from an output component of the smart glasses worn by person 220.

In the example of FIG. 2, an original author may desire to digitally sign an object, such as object 208, which may include a paper document. In that case, the original author may affix digital signature 212 to object 208, which may already contain a message 210 that the original author intends to sign and send. Digital signature 212 may correspond to the result of encrypting all or part of message 210 with the signer's private key or the result of encrypting a hash of all or part of message 210.

Upon receiving object 208, person 220 may view object 208 through smart glasses. As used herein, the phrase "smart glasses" generally refers to any head-mounted computational system that includes a visual sensor and an output component. In some examples, smart glasses may resemble reading glasses, sunglasses, life recording devices, augmented reality glasses such as GOOGLE GLASS, and/or virtual reality glasses such as OCULUS RIFT (e.g., headwear without any translucent or transparent lenses). The smart glasses may autonomously, semi-autonomously, and/or upon user command, detect, attempt to validate, and/or validate object 208 including message 210 using digital signature 212, including any permutation of steps 302-308 of FIG. 3, as discussed further below. In one example, person 220 and/or the smart glasses may validate object 208 by verifying that σ^e≡m (mod N), as mentioned above.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing database 120 and/or facilitating validation of digitally signed objects in cooperation with computing device 202. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
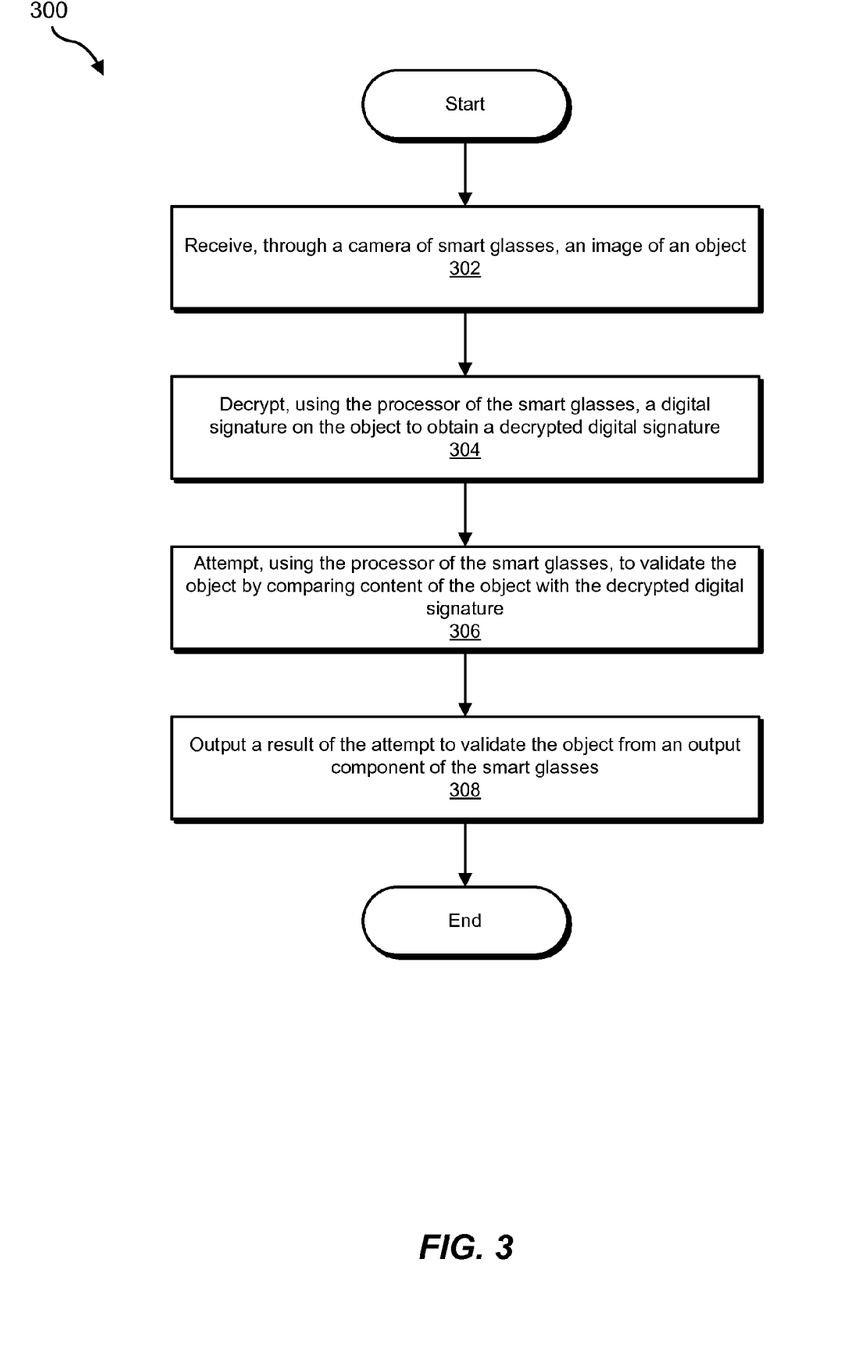
FIG. 3 is a flow diagram of an exemplary method for validating digital signatures.

FIG. 3 is a flow diagram of an exemplary computer-implemented method 300 for validating digital signatures. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive, through a camera of smart glasses, an image of an object. For example, reception module 104 may, as part of computing device 202 in FIG. 2, receive, through a camera of the smart glasses (such as those worn by person 220 in FIG. 2), an image of object 208.

As used herein, the phrase "object" generally refers to any entity that can be digitally signed and viewed, including any entities capable of containing visible text or visible digital signatures. In some embodiments, object 208 may correspond to a paper or non-paper document, such as documents shown on an LCD or e-ink display.

Reception module 104 may receive the image of object 208 in a variety of ways. In some embodiments, reception module 104 may take a picture of object 208. The picture may show all or part of object 208. In some examples, reception module 104 may take the picture autonomously, semi-autonomously, upon a user command, and/or accordingly to a default schedule, predetermined schedule, or user-defined schedule (e.g., at a specified time interval). Reception module 104 may take the picture as part of continuous video recording, as part of a series or burst of pictures, and/or as a single shot picture.

In some examples, reception module 104 may receive the image of object 208 in response to detecting a candidate object that potentially contains a digital signature. Reception module 104 may detect the candidate object by receiving a user command to take a picture, by receiving user input indicating the presence of a candidate object, and/or by receiving a visual and/or auditory indication that the candidate object is present (e.g., that an object may be present that may contain a digital signature available for verification). As discussed throughout this application, users of smart glasses (e.g., those wearing and/or those in communication with smart glasses) may provide any user command to smart glasses in any suitable manner. User commands may include voice commands and commands made through gestures, buttons, and/or pads. These input components, such as buttons and pads, may be located on the glasses or on devices (e.g., smart phone, handheld control, and/or wrist control device) in communication with the smart glasses.

Reception module 104 may detect the candidate object by detecting features (e.g., visual features) indicative of a digital signature. In some examples, reception module 104 may detect visual features at a depth, resolution, angle, orientation, and/or clarity sufficient to indicate the presence of a digital signature, but not sufficient to decrypt the digital signature. In response, reception module 104 may notify a user about the candidate object. Reception module 104 may also instruct a user to improve one or more of depth, resolution, angle, orientation, and/or clarity (e.g., directions to move or orient the user, smart glasses, and/or object, in one or more directions to improve these measurements, increase or decrease zoom, alter focus, turn flash on or off, and/or directions to be more still). Specifically, reception module 104 may identify a deficiency for one or more measurements (e.g., zoom, lightening, focus, distance, orientation, angle, image file size or capacity, etc.), may identify a direction of the deficiency along that measurement, and may prompt, instruct, request, and/or autonomously alter settings or circumstances in the opposite direction to improve the measurement. In general, reception module 104 may autonomously perform one or more of these improvements (e.g., alter flash, zoom, focus, and/or image file size/type settings), and/or request permission to do the same.

As discussed throughout this application, smart glasses may communicate any result to a user, such as a wearer, through speakers (e.g., over the ears), augmented reality or other visual display, haptic feedback, vibration, direct neural (e.g., computer-brain) connection, and/or wireless or wired connection to another computing system, television, display, or other output device (e.g., room speakers). Reception module 104 may repeat a cycle of detecting a candidate object and altering settings or circumstances to improve detection of the candidate object iteratively until receiving the image sufficient to decrypt digital signature 212.

In some embodiments, reception module 104 may identify a candidate object by identifying one or more features indicating the potential presence of a digital signature. The feature may include a bar code, a two-dimensional barcode, a watermark, and/or a string of characters having the structure of a hash (e.g., satisfying a randomness threshold and/or fitting a size of one or more hash functions used by a digital signature verification system of the smart glasses). The feature may also include any other arbitrary symbol, character, graphic, and/or code predefined as indicating the presence of a digital signature. The symbol, character, graphic, and/or code may also be stored within a bar code, two-dimensional bar code, and/or watermark, and/or may be indicated by a hash of the same.

Reception module 104 may scan, autonomously or upon command, pictures and/or video streams for one or more features indicating the presence of candidate objects, digital signatures, and/or potential digital signatures. Upon detecting one or more features of a candidate object, reception module 104 may autonomously instruct another module (e.g., decryption module 106 and/or validation module 108) to attempt to decrypt the digital signature and/or validate the candidate object, as discussed further below. Reception module 104 may also notify a user or wearer of the smart glasses about the candidate object. Not all bar codes, watermarks, and/or hashes may include digital signatures. Accordingly, reception module 104 may refrain from notifying a user until confirming that a digital signature is present. In some examples, reception module 104 may confirm the presence of digital signature, notify a user about the presence of a digital signature, await confirmation to attempt to verify the digital signature, and only then attempt the verification after receiving confirmation from a user.

In other examples, reception module 104 or another module may autonomously attempt to verify some or all digital signatures that are detected. In further examples, reception module 104 may only attempt to verify barcodes, watermarks, and/or hashes as valid digital signatures upon detecting an additional indication of the presence of a digital signature (e.g., in addition to the presence of a barcode, watermark, and/or hash), such as a user command or hint, and/or a predefined symbol or graphic indicating the presence of a digital signature (which may be shown outside of the barcode, watermark, and/or hash, or may be embedded within one of these).

In some examples, reception module 104 may obtain a file for object 208 upon receiving an image indicating that object 208 potentially contains a digital signature. For example, reception module 104 may identify object 208 (e.g., using one or more object detection heuristics) and then identify a previously-taken picture (which may be higher quality) of object 208, which may be stored in a memory of the smart glasses or elsewhere. Similarly, reception module 104 may identify a location of a file (e.g., a word processing, text, or image file) where object 208 constitutes a print out of the file or otherwise shows part of the content of the file. The location of the file may be explicitly identified, and/or partially indicated or suggested, by plain text, a two-dimensional bar code, and/or a watermark on object 208, as discussed further below. The location may be internal to the smart glasses, on a desktop, laptop, smart phone, or mobile computing device, on the cloud, local area network, or wide area network including the Internet.

The identified location may store an original or higher-fidelity copy of data corresponding to (e.g., the source of) the image of the object received by reception module 104. In some examples, reception module 104 may perform one or more checks, such as hash comparisons, to determine whether content on the object has materially altered from a version on the obtained file (e.g., altered from the original source file). Reception module 104 may use the original copy, higher fidelity copy, and/or other copy of the file (e.g., source of the object) to verify the digital signature. Reception module 104 may use the original copy in addition to, or instead of, using the image obtained through the camera of the smart glasses. For example, reception module 104 may use the file upon user approval, upon verifying that content has not changed between the file and the object, and/or if the smart glasses cannot obtain a sufficiently high-fidelity image of the object to perform authentication, such as if the object is damaged, if the object is at a distance, and/or if lighting or photography conditions are insufficient along one or more dimensions, as discussed above.

Returning to FIG. 3, at step 304 one or more of the systems described herein may decrypt, using the processor of the smart glasses, a digital signature on the object to obtain a decrypted digital signature. For example, decryption module 106 may, as part of computing device 202 in FIG. 2, decrypt, using the processor of the smart glasses, digital signature 212 on object 208 to obtain a decrypted digital signature.

Decryption module 106 may decrypt digital signature 212 on object 208 to obtain a decrypted digital signature in a variety of ways. In some examples, decryption module 106 may decrypt the digital signature on the object to obtain the decrypted digital signature at least in part by decrypting the digital signature using a public key. Decryption module 106 may select and/or load the public key from a repository of public keys. The overall digital signature system may encrypt data and/or protect the public key using a public-key infrastructure, third party certificate authority, PRETTY GOOD PRIVACY (PGP) encryption, the PGP-based WEB OF TRUST, and/or blockchain functionality to address the problem of public key authentication. A local or remote database, such as database 120, may store a copy of the public key (e.g., a social networking site, a public-key infrastructure, and/or certificate authority). Decryption module 106 may match a candidate author of content on object 208 to a public key for the candidate author. Moreover, decryption module 106 may detect the candidate author through user input from a user of the smart glasses. Additionally, or alternatively, decryption module 106 may detect the candidate author from an indication of authorship on object 208, which may be explicit in plain text, a symbol, encoded, and/or embedded within a barcode and/or watermark, or indicated by a hash of the candidate author's identifier. Notably, in an alternative embodiment, the signer may sign with a public key of the intended recipient and the smart glasses may decode the object with the recipient's private key, thereby enabling confidential reading by the reader, which is the converse of a digital signature system.

Figure 4:
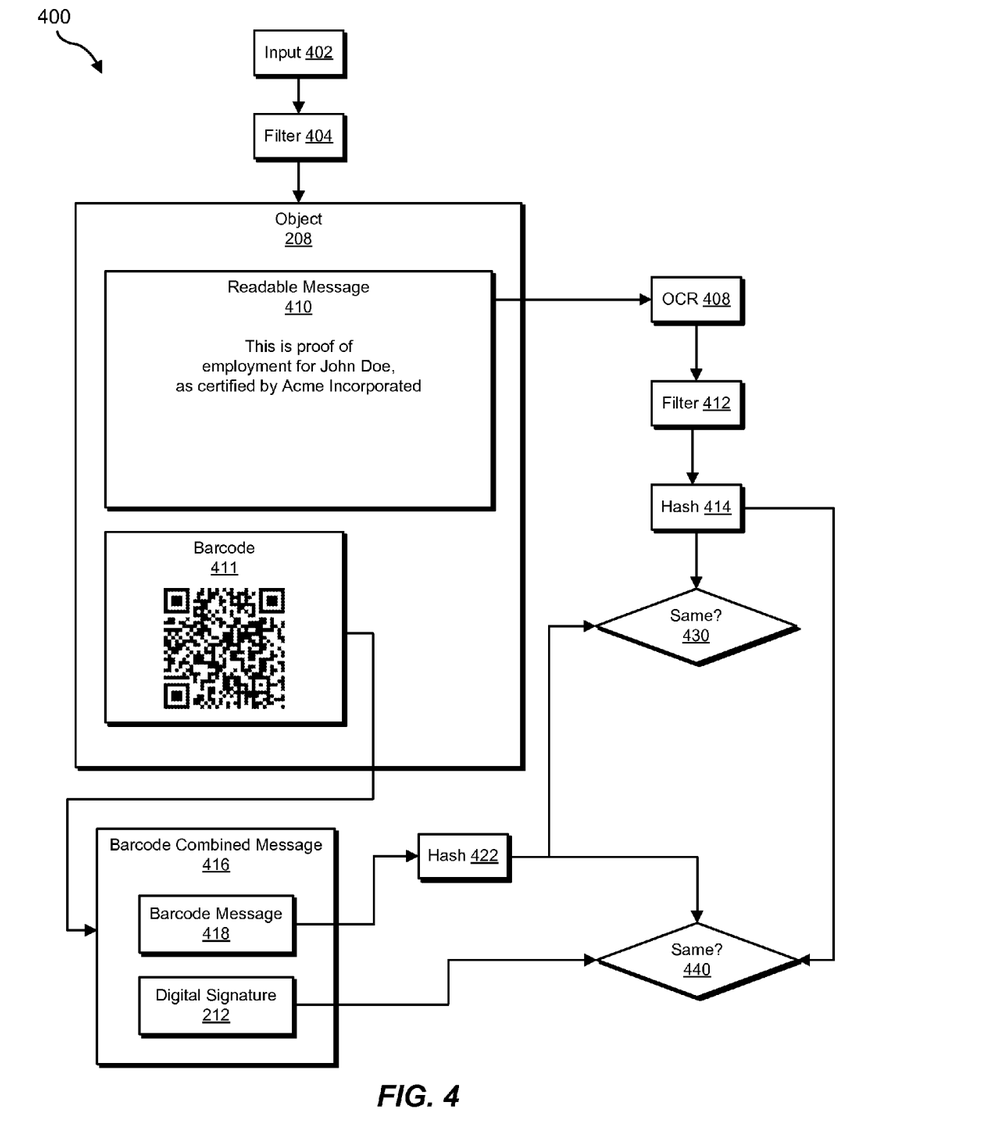
FIG. 4 is a block diagram of an exemplary work flow for validating an object that contains a digital signature.

FIG. 4 shows a block diagram 400 of exemplary object 208, such as a paper document. The content of object 208 may correspond to message 210 in FIG. 2 and/or a readable message 410 in FIG. 4, for example, and as discussed further below. Object 208 may also contain a barcode 411, such as a two-dimensional barcode or matrix code, including a QR-Code. In addition to including barcode 411 or as an alternative to including barcode 411, object 208 may include a watermark encoding the data encoded in barcode 411. Object 208 may alternatively include a plain character string representation of the same data. As shown, readable message 410 may contain a message that benefits from digital signing by the author or certifying authority. For example, digital signature 212 may enable an employer to sign, and therefore make provably authentic, readable message 410, which reads "This is proof of employment for John Doe, as certified by Acme Incorporated." The signing author may include any individual or organization, including a government, a quasi-government, a private organization, a non-profit organization, and/or a corporate institution.

In the example of FIG. 4, the original author or signer may input, at input step 402, a message to receive a digital signature. Optionally, the signer's encryption system may filter the message at filter step 404 to improve encryption and/or optical character recognition of readable message 410. For example, the encryption system may improve optical character recognition by removing, reducing, and/or minimizing certain characters (such as "s" which may be read as "f"; "h" which may be read as "Ii" or "b"; "e" which may be read as "c"). Similarly, the encryption system may improve optical character recognition by removing, reducing, and/or minimizing periods, spaces (e.g., including extra spaces or double spaces), quotation marks, and other or all grammatical symbols. The encryption system may also improve optical character recognition by removing, reducing, and/or minimizing strings of characters (such as "sh", which may be read as "m"), and/or words that tend to cause errors in optical character recognition (including words that contain one or more of the above characters). The encryption system may also limit the message to words, characters, or symbols in a known lexicon (e.g., known by the reading smart glasses), which may omit, reduce, or minimize the above characters and/or words in comparison to a dictionary. The encryption system may also force readable message 410 to satisfy predetermined rules, including rules that specify how the message begins or ends (e.g., with any or a specific character or character string, as a delimiter) and/or how spacing occurs (e.g., no line spacing and/or no double spaces, etc.). Moreover, the encryption system may also format readable message 410 to improve optical character recognition by selecting and applying a fixed-pitch or optical character recognition-friendly font, including OCR-A, OCR-B, and/or MICR fonts, and/or inserting gridlines (e.g., one character or glyph per box). In some examples, the encryption system may enforce one or more of the above rules by disallowing messages that do not confirm, recommending alterations and/or revisions (e.g., synonyms, as replacements, known to be less likely to cause errors) to make the candidate message conform. The encryption system may also, or alternatively, enforce one or more of the above rules by autonomously modifying the candidate message for conformance (and optionally requesting user confirmation that the changes are approved).

In the example of FIG. 4, decryption module 106 may detect and decode barcode 411, which generates a result of decoding. The result of decoding may include a compressed or decompressed item of data. If compressed (e.g., using a zip program), decryption module 106 may further decompress the result. As shown in FIG. 4, in either case (compression or not), the final result of decoding may include a barcode message 418, which may be the same, similar, and/or different from readable message 410 (e.g., different in the case of tampering or inauthentic documents), as well as digital signature 212, both included within a barcode combined message 416. Decryption module 106 may decrypt digital signature 212 using a public key, as discussed above.

Although FIG. 4 shows a single readable message 410 and a single barcode 411, object 208 may include only one of either, and multiples of either. For example, object 208 may include any number of readable messages, and may include any number of barcodes/hashes/watermarks or other graphics that embed information within the document. Any particular barcode/hash/watermark may contain an optional message and/or digital signature, either of which may be compared with (A) each other, (B) any permutation of readable messages, subsets of readable messages, and/or variations of optical recognition results of all or part of various readable messages, and/or (C) any permutation of other messages and/or digital signatures. In the case of signing multiple messages, sub-messages, and/or hashes of messages or sub-messages, the signer may orient them, prior to digital signing and/or encoding in a barcode/watermark/hash, in a predetermined manner known or shared with the reader (or indicated or encoded on object 208 using a private encryption scheme), such as concatenating them (e.g., in a predetermined order) and/or interweaving them. The reader may thereby derive multiple messages, sub-messages, and/or hashes of messages or sub-messages from decoding a single barcode/watermark and/or decrypting a single digital signature of their aggregation. As further discussed below, the smart glasses then may estimate authenticity based on a number of hashes or messages (e.g., sub-messages) that match, a degree of similarity between text that matches the digitally signed message and a printed or bar-encoded message, and/or whether these numbers and/or degrees match one or more (e.g., predefined) thresholds.

Returning to FIG. 3, at step 306 one or more of the systems described herein may attempt, using the processor of the smart glasses, to validate the object by comparing content of the object with the decrypted digital signature. For example, validation module 108 may attempt, using the processor of the smart glasses, to validate object 208 by comparing the content of object 208 with the decrypted digital signature from digital signature 212. As used herein, the phrase "validate the object" generally refers to verifying that a digital signature on the object is authentic, including for example verifying that the decrypted digital signature matches corresponding content on the object (or a hash thereof). As used herein, the phrase "content of the object" generally refers to some or all content (e.g., a message) printed, displayed, embedded, and/or contained within the object, and/or data derived from the same, including a hash of the same. Examples include message 210, readable message 410, and/or barcode message 418. Notably, both readable message 410 and barcode message 418 are optional, such that one may be included while the other one is omitted (and, naturally, a comparison step 430 to verify that they are the same may also be omitted, as discussed further below).

Validation module 108 may attempt to validate object 208 by comparing the content of object 208 with the decrypted digital signature in a variety of ways. In some embodiments, validation module 108 may attempt to validate object 208 at least in part by computing, using a processor of the smart glasses, a hash based on the content of object 208. For example, validation module 108 may compute hash 414 based on content of object 208 at least in part by performing optical character recognition, at step 408, on human-readable characters, such as readable message 410, on object 208. Validation module 108 may then compute a hash of the optically recognized characters to generate a hash 414.

In some examples, in response to a user command, validation module 108 may attempt to validate object 208 by comparing hash 414 with the decrypted digital signature from digital signature 212, at a comparison step 440. Alternatively, validation module 108 may, in response to detecting digital signature 212, autonomously attempt to validate object 208 by comparing hash 414 with the decrypted digital signature from digital signature 212. Alternatively, validation module 108 may omit or skip the computation of hash, and the smart glasses may attempt to validate object 208 by comparing the content of object 208 directly with a result of decrypting digital signature 212.

As shown in FIG. 4, validation module 108 may compare a result of decrypting digital signature 212 with one or both of the hashes 414 and 422 (or corresponding content that would form the source of the hash(es), if hashing is omitted). In some examples, validation module 108 may require all three items (readable message 410, barcode message 418, and results of decrypting digital signature 212) to match. In other examples, validation module 108 may decrement an estimation of authenticity based on a failure, or degree of failure, of one or more validation checks. For example, validation module 108 may decrement an estimation of authenticity based on a degree of difference or distance, in terms of alphanumeric changes or optical character recognition variations, between one message and another of these three items.

Validation module 108 may compute one or multiple hashes based on all, part, or different parts of a single result of optical character recognition. Additionally, or alternatively, validation module 108 may compute a hash for each of multiple different variations of the result of the optical character recognition. For example, validation module 108 may perform optical character recognition on all, part, or parts of readable message 410. Instead of computing the hash on an entirety of readable message 410, validation module 108 may compute the hash based on a predefined subset of readable message 210. Predefined formulas for defining the subset may include every other character and/or word (skipping or including the first character/word), or any other formula for reducing the entire content of readable message 410.

Reducing the entire content of readable message 410 may enable validation module 108 to reduce the brittleness of hash comparisons to accommodate the imperfection in optical character recognition technology. Specifically, reducing the entire content of readable message 410 may enable validation module 108 to compute multiple hashes, each for different subsets of readable message 410.

Notably, reducing the entire content of readable message 410 may enable an attacker to modify the remainder of readable message 410 without undermining a validation process. The encryption system may address this problem in one or more of several ways. Validation module 108 may indicate a degree of authentication, and decrease the degree of authentication in proportion to the proportion of the validated (e.g., hashed) subset to the entirety of readable message 410, and/or in proportion to a number of different validated subsets to all checked subsets. Similarly, validation module 108 may warn a user about the potential for the attacker to undermine authentication, and make the warning in proportion to the danger (as discussed above). The larger encryption system may also warn the signer not to compose messages that can dramatically change meaning through the alteration of just one or more characters. Most importantly, the signer and intended recipient can keep the algorithm for reducing the entire readable message secret between them and/or may keep an algorithm secret for placing a code on object 208 that indicates which of one or more reducing algorithms was used. Moreover, when more than one hashes of different subset of readable message 410 are used, the signer may encrypt their concatenation (where each has a predefined or computable length) with the signer's private key, enabling the intended recipient to verify which, if any, of the hashes match those from the optical character recognition. Alternatively, validation module 108 may compute just one hash for the entirety of readable message 410.

For characters (or words or lines or paragraphs) in readable message 410, validation module 108 may compute multiple results of optical character recognition, including for example a best estimate, a second best estimate, a third best estimate, and so on. Validation module 108 may then generate permutations, based on variations of one or more characters or words or lines, etc., of optical character recognition results. Furthermore, validation module 108 may compute multiple hashes each for one or more of the permutations. If one or more of the hashes of the permutations matches one or more hashes decrypted from digital signature 212, then validation module 108 may indicate the result to the user. Validation module 108 may also indicate where the variation in optical character recognition took place. Validation module 108 may similarly highlight any deviation from barcode message 418, enabling the user to estimate a likelihood of authentication and/or whether the deviation is due to innocent error in optical character recognition or, instead, an attacker or corruption, as discussed further below.

In some examples, validation module 108 may compute hash 422 based on content of object 208 at least in part by decoding a two-dimensional bar code, such as barcode 411, on object 208. Validation module 108 may further decompress a result of decoding the two-dimensional bar code, as discussed above. Lastly, validation module 108 may compute hash 422 based on a message, such as barcode message 418, contained within the decompressed result of decoding the two-dimensional bar code. In some examples, validation module 108 may attempt to validate object 208 at least in part by comparing hash 414 based on a result of optical character recognition of human-readable characters on object 208 with hash 422 based on barcode message 418 extracted from barcode 411 on object 208.

Figure 5:
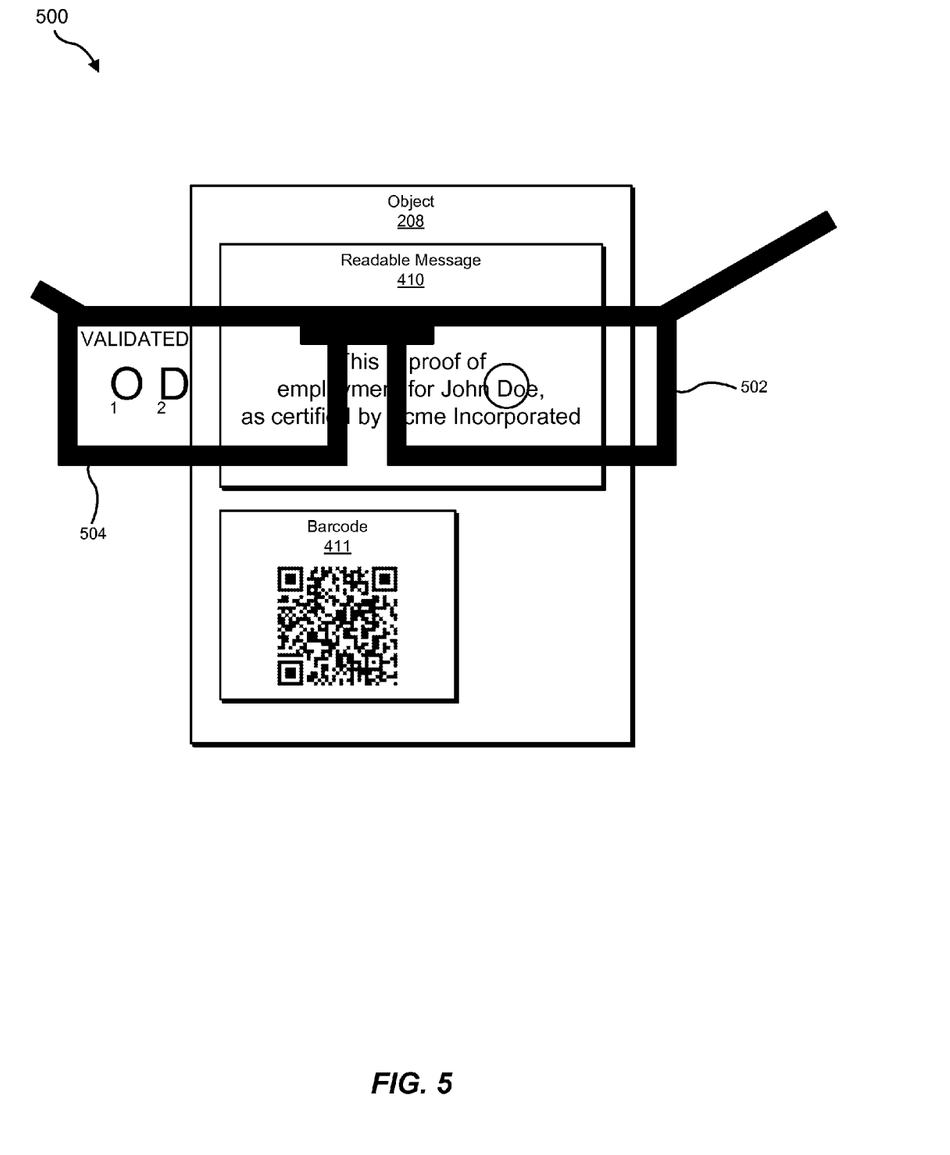
FIG. 5 is a block diagram of exemplary smart glasses overlaying an exemplary object that contains a digital signature.

In further examples, validation module 108 (e.g., in cooperation with output module 110, as discussed further below) may attempt to validate object 208 at least in part by displaying a result, through the output component of the smart glasses, of the message, such as barcode message 418, extracted from the two-dimensional bar code while the smart glasses are oriented for viewing at least part of the human-readable characters, thereby enabling the user to identify errors in optical character recognition. FIG. 5 shows a block diagram 500 of exemplary smart glasses overlaying object 208 such that a wearer of the smart glasses may view object 208 through a right lens 502 and/or left lens 504 while receiving the benefit of augmented reality and/or annotations, by the smart glasses, on object 208. As shown in FIG. 5, the smart glasses may highlight one character, glyph, word, clause, sentence, paragraph, section, and/or other portion of content on object 208. Specifically, the smart glasses circle the "D" in "John Doe" overlapping right lens 502. The smart glasses may further display candidates for recognition and/or comparison of the highlighted portion of the content, based on one or more results of optical character recognition and/or one or more barcode messages, such as barcode message 418. In the example of FIG. 5, optical character recognition produces a best guess of "O" and a second best guess of "D" for the highlighted "D" on object 208. That error in optical character recognition might break a validation process (e.g., in the case that the smart glasses are only using a single hash for the entirety of readable message 410. The user may correct the error by selecting the "D", such as by pressing a "2" button (as shown in left lens 504), or otherwise making input designating the correct content.

For comparison between one or more of (A) content on object 208, (B) content in barcode message 418, and/or (C) results of optical character recognition of all or parts of readable message 410, the smart glasses may orient two or more of these proximate and/or distal from each other in separate lenses and/or in the same lens. In the example of FIG. 5, candidates for accurate results of optical character recognition are shown in a separate lens, distant from the highlighted character on object 208 being analyzed, and in a portion of left lens 504 not overlapping text or content on object 208. Alternatively, the smart glasses may display these candidates adjacent to the highlighted character on object 208 and/or within the same lens. The comparison may enable the user to correct errors in optical character recognition and/or verify a degree of similarity, or sufficient similarity, between readable message 410 and barcode message 418.

Returning to FIG. 3, at step 308 one or more of the systems described herein may output a result of the attempt to validate the object from an output component of the smart glasses. For example, output module 110 may output a result of the attempt to validate object 208 from an output component of the smart glasses worn by person 220.

Output module 110 may output the result of the attempt to validate object 208 from an output component of the smart glasses in a variety of ways. As discussed above, output module 110 may indicate a result through augmented reality, a display of the smart glasses, speakers of the smart glasses, a vibration, haptic feedback, a brain-computer wireless or wired interface, and/or to any other output device (e.g., smart phone, home laptop, home speakers) in wired or wireless communication with output module 110. In some examples, output module 110 may output a binary result of whether validation succeeded or failed. Output module 110 may also output a proportional or granular estimate of whether validation succeeded, as discussed above. Output module 110 may also output any information about the validation process, including all items of information and computations discussed above, including: a current step of the validation process, a number or type of validation check performed (and their details), all of part of (A) readable content on object 208, (B) encoded content on object 208, and/or (C) signed content on object 208, while optionally highlighting where two or more of (A)-(C) deviate and/or correspond. If validation failed, or was low, or upon user request, output module 110 may output one or more instructions or options for attempting to improve or correct validation, such as instructions or guidance for improving photography, optical character recognition, barcode/watermark recognition, or character or message comparison (including all of the output discussed for FIG. 5). For example, output module 110 may offer to compare the result of decryption with further subsets of messages and/or further variants of optical character recognition.

As discussed above, the disclosed systems and methods may enable users to conveniently, and more efficiently, identify candidate documents for validation, validate them, and/or overcome errors or setbacks in a validation process, while minimizing interruptions in reading the document. For example, smart glasses may autonomously detect candidate documents for validation, validate them, and/or output results of attempts to validate the documents, without interrupting a user's reading or requiring the user to manually scan and process the documents.

Figure 6:
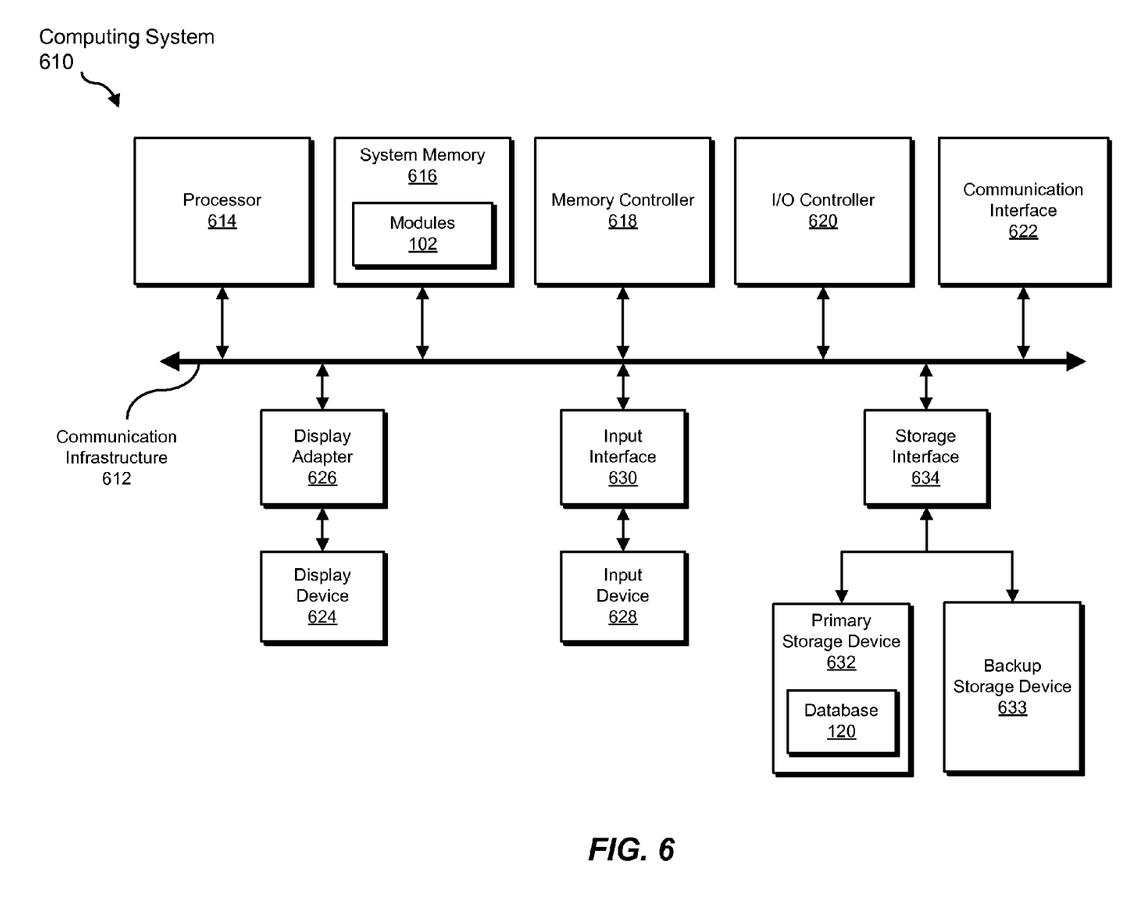
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
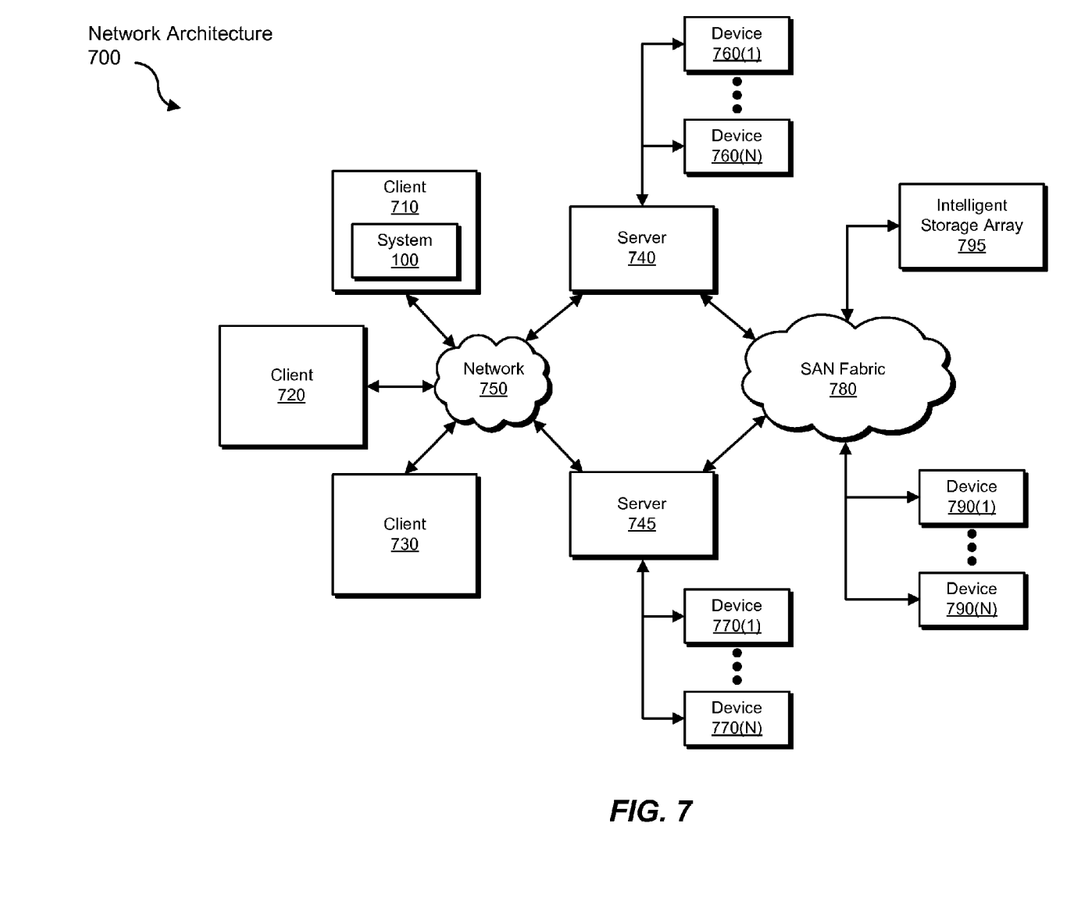
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for validating digital signatures.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a document image and/or request to authenticate the document to be transformed, transform all or part of the image/request, or data derived therefrom, output a result of the transformation to a display or smart glasses, use the result of the transformation to authenticate or invalidate the document, and store the result of the transformation to a memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for validating digital signatures, at least a portion of the method being performed by a computing device comprising at least one processor, the method comprising:
scanning, using a processor of smart glasses, images autonomously captured by a camera of the smart glasses for characters that have a structure corresponding to a hash of an electronic message to detect an object that potentially contains a digital signature;
receiving, through the camera of the smart glasses and in response to the processor of the smart glasses autonomously detecting the object that potentially contains the digital signature, an image of the object;
decrypting, using the processor of the smart glasses, the digital signature on the object to obtain a decrypted digital signature;
attempting, using the processor of the smart glasses, to validate the object by comparing content of the object with the decrypted digital signature;
outputting a result of the attempt to validate the object from an output component of the smart glasses.

2. The method of claim 1, wherein attempting to validate the object by comparing the content of the object with the decrypted digital signature is performed in response to a user command.

3. The method of claim 1, wherein attempting to validate the object by comparing the content of the object with the decrypted digital signature is performed autonomously by the smart glasses in response to detecting the digital signature on the object.

4. The method of claim 1, wherein the object comprises a paper document.

5. The method of claim 1, wherein attempting to validate the object by comparing the content of the object with the decrypted digital signature comprises computing, using the processor of the smart glasses, a hash based on the content of the object.

6. The method of claim 5, wherein computing the hash based on the content of the object comprises:
performing optical character recognition on human-readable characters on the object;
computing the hash based on a result of the optical character recognition.

7. The method of claim 6, wherein computing the hash based on the content of the object comprises computing a hash for each of multiple different variations of the result of the optical character recognition.

8. The method of claim 5, wherein computing the hash based on the content of the object comprises:
decoding a two-dimensional bar code on the object;
decompressing a result of decoding the two-dimensional bar code;
computing the hash based on a message contained within the decompressed result of decoding the two-dimensional bar code.

9. The method of claim 1, wherein attempting to validate the object further comprises comparing a hash based on a result of optical character recognition of human-readable characters on the object with a hash based on a message extracted from a two-dimensional bar code on the object.

10. The method of claim 9, wherein attempting to validate the object comprises displaying a result, through the output component of the smart glasses, of the message extracted from the two-dimensional bar code while the smart glasses are oriented for viewing at least part of the human-readable characters, thereby enabling a user to identify errors in optical character recognition.

11. The method of claim 1, wherein decrypting the digital signature on the object to obtain the decrypted digital signature comprises decrypting the digital signature using a public key.

12. The method of claim 1, wherein attempting to validate the object by comparing the content of the object with the decrypted digital signature comprises computing a hash based on a predefined subset of human-readable characters on the object.

13. A system for validating digital signatures, the system comprising:
a physical processor of smart glasses;
a reception module, stored in memory, that:
scans, using the physical processor of the smart glasses, images autonomously captured by a camera of the smart glasses for characters that have a structure corresponding to a hash of an electronic message to detect an object that potentially contains a digital signature;
receives, through the camera of the smart glasses and in response to the physical processor of the smart glasses autonomously detecting the object that potentially contains the digital signature, an image of the object;
a decryption module, stored in memory, that decrypts, using the physical processor of the smart glasses, the digital signature on the object to obtain a decrypted digital signature;
a validation module, stored in memory, that attempts, using the physical processor of the smart glasses, to validate the object by comparing content of the object with the decrypted digital signature;
an output module, stored in memory, that outputs a result of the attempt to validate the object from an output component of the smart glasses;
wherein the reception module, the decryption module, the validation module, and the output module are executed by the physical processor of the smart glasses.

14. The system of claim 13, wherein the validation module attempts to validate the object by comparing the content of the object with the decrypted digital signature in response to a user command.

15. The system of claim 13, wherein the validation module attempts to validate the object by comparing the content of the object with the decrypted digital signature autonomously, through the smart glasses, in response to detecting the digital signature on the object.

16. The system of claim 13, wherein the validation module attempts to validate the object by comparing the content of the object with the decrypted digital signature at least in part by computing, using the physical processor of the smart glasses, a hash based on the content of the object.

17. The system of claim 16, wherein the validation module computes the hash based on the content of the object at least in part by:
performing optical character recognition on human-readable characters on the object;
computing the hash based on a result of the optical character recognition.

18. The system of claim 17, wherein the validation module computes the hash based on the content of the object at least in part by computing a hash for each of multiple different variations of the result of the optical character recognition.

19. The system of claim 16, wherein the validation module computes the hash based on the content of the object at least in part by:
  decoding a two-dimensional bar code on the object;
  decompressing a result of decoding the two-dimensional bar code;
  computing the hash based on a message contained within the decompressed result of decoding the two-dimensional bar code.

20. A non-transitory computer-readable medium comprising one or more computer-executable instructions that, when executed by at least one processor of a computing device, cause the computing device to:
  scan, using a processor of smart glasses, images autonomously captured by a camera of the smart glasses for characters that have a structure corresponding to a hash of an electronic message to detect an object that potentially contains a digital signature;
  receive, through the camera of the smart glasses and in response to the processor of the smart glasses autonomously detecting the object that potentially contains the digital signature, an image of the object;
  decrypt, using the processor of the smart glasses, the digital signature on the object to obtain a decrypted digital signature;
  attempt, using the processor of the smart glasses, to validate the object by comparing content of the object with the decrypted digital signature;
  output a result of the attempt to validate the object from an output component of the smart glasses.

* * * * *